2,891,502
AUTOMATIC DEGAUSSING CONTROL SYSTEM

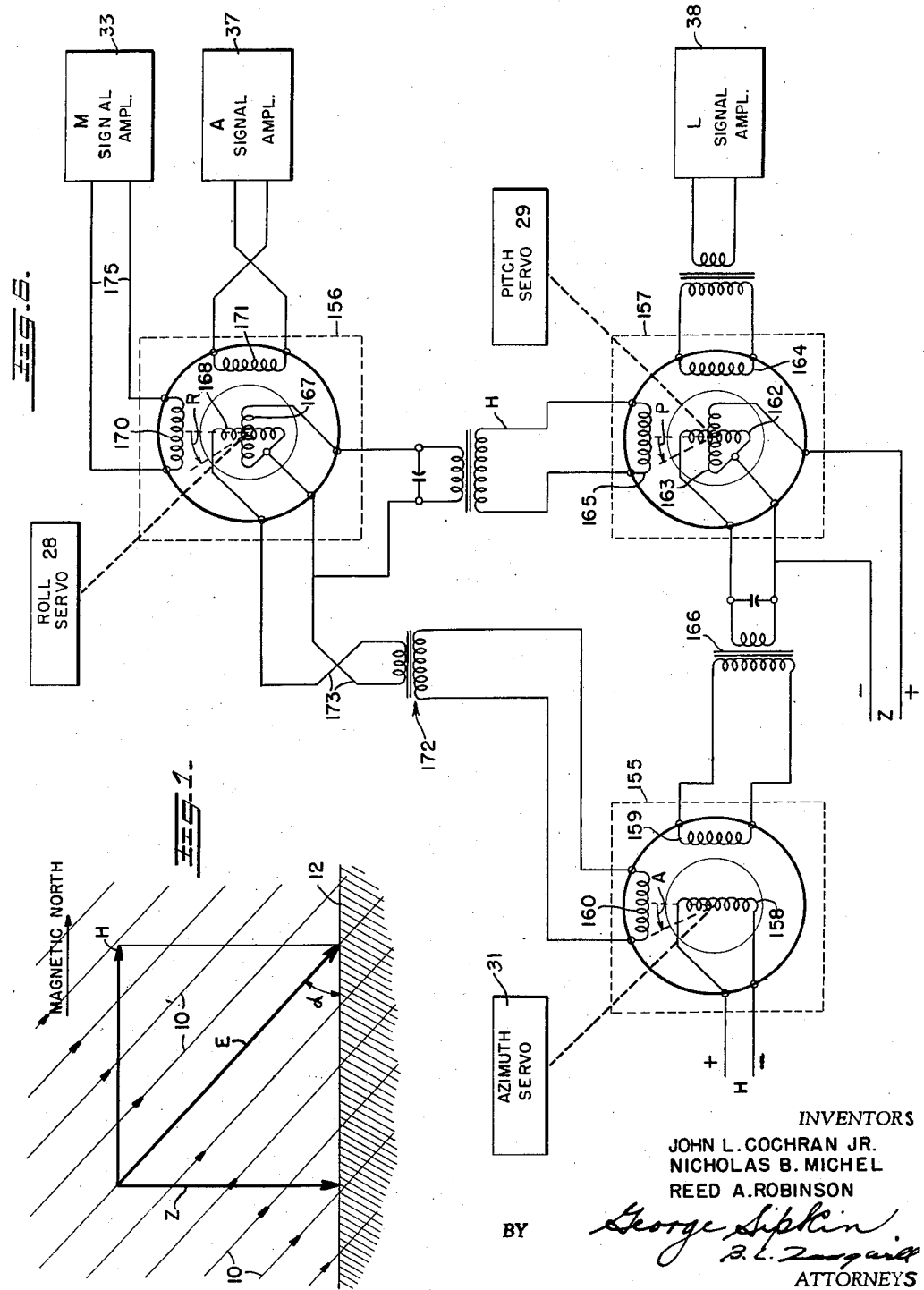

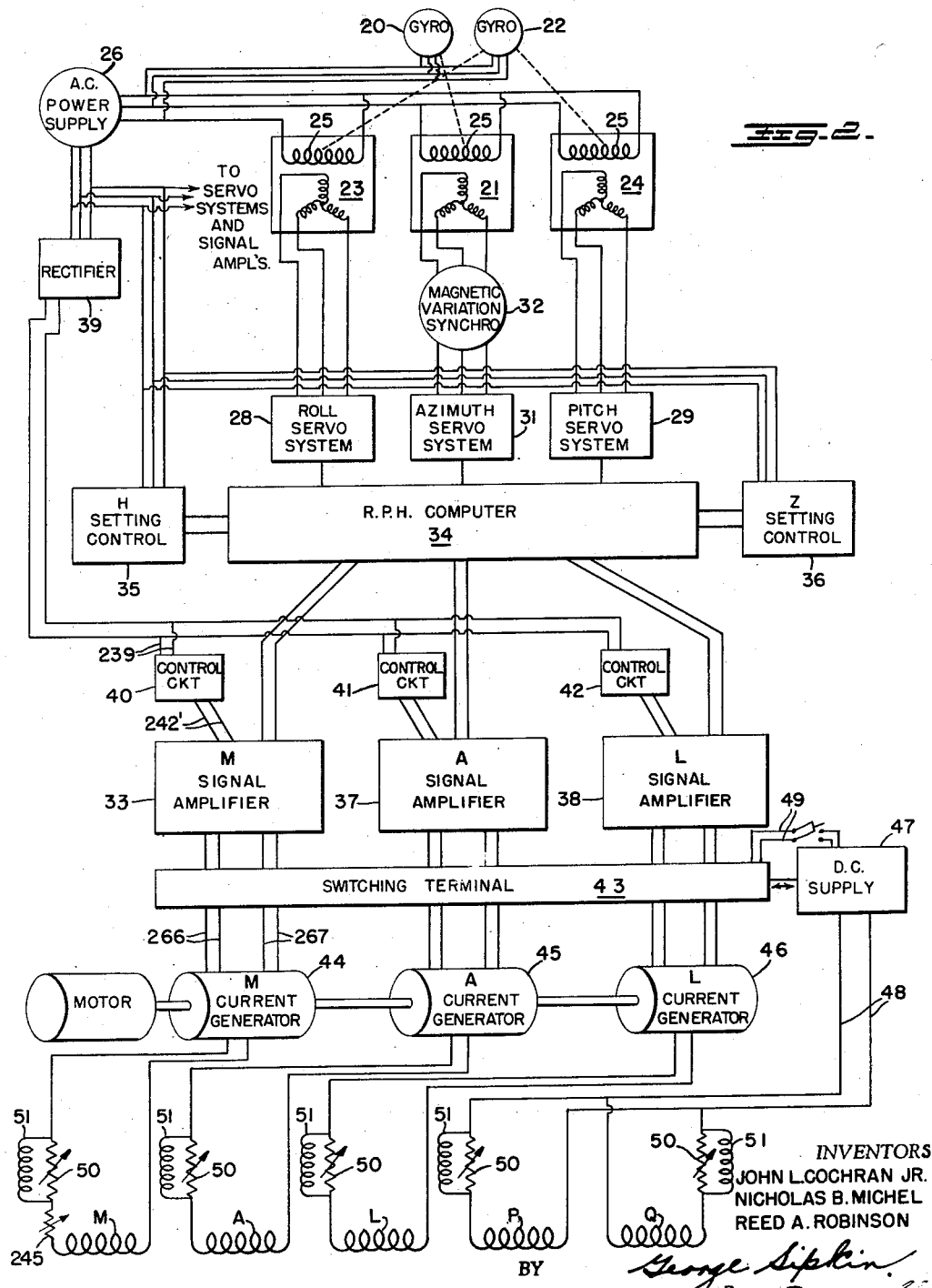

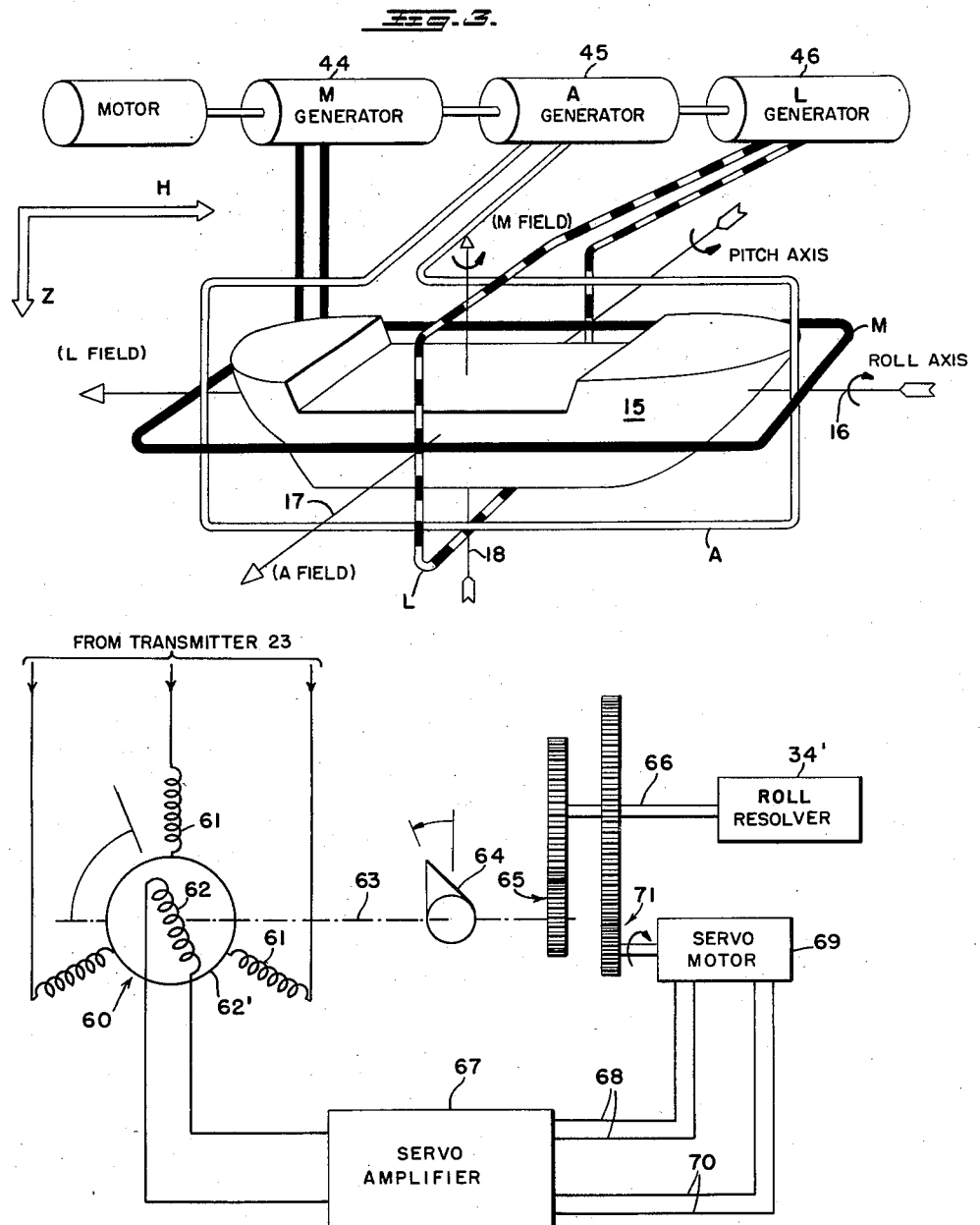

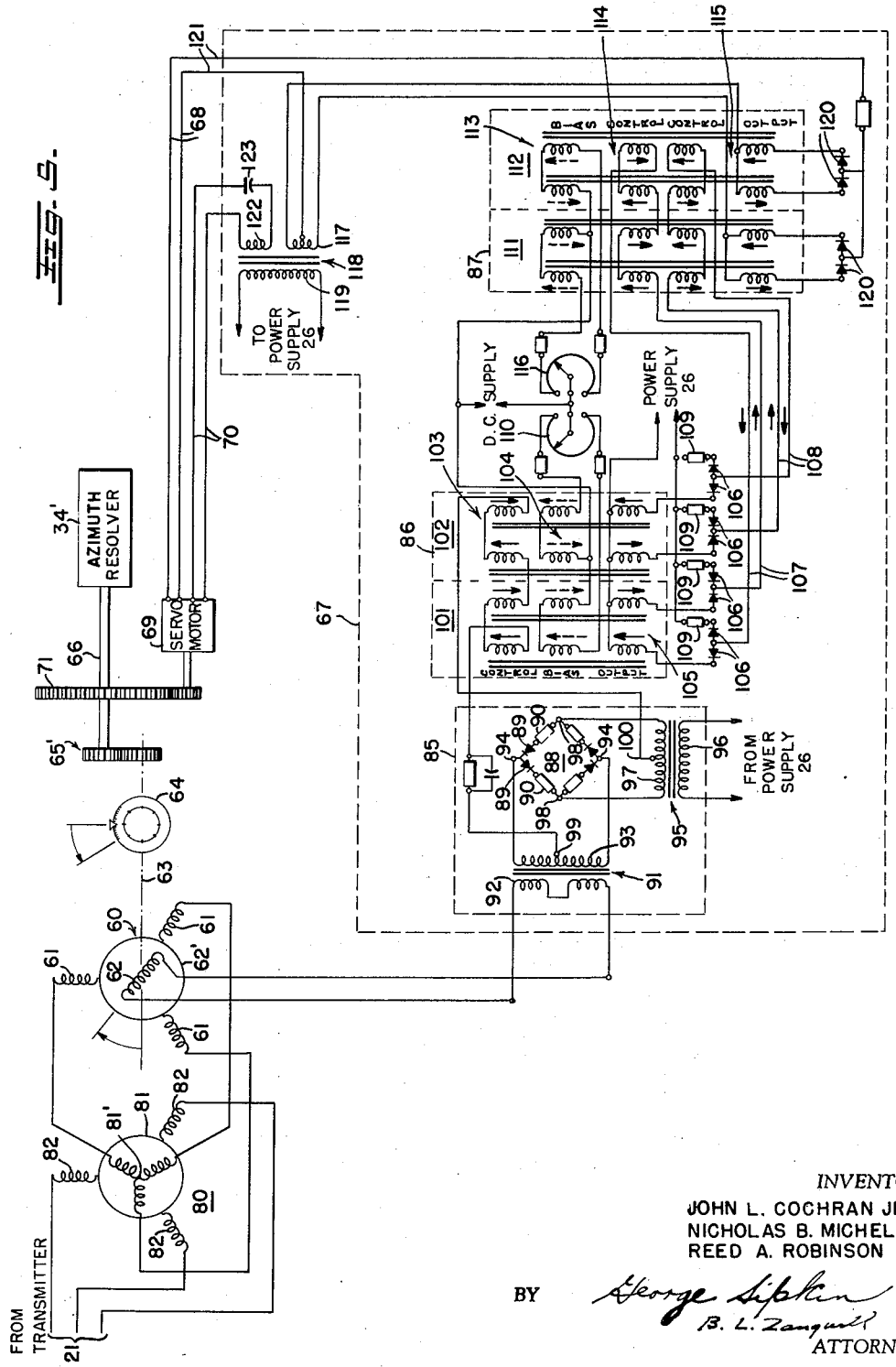

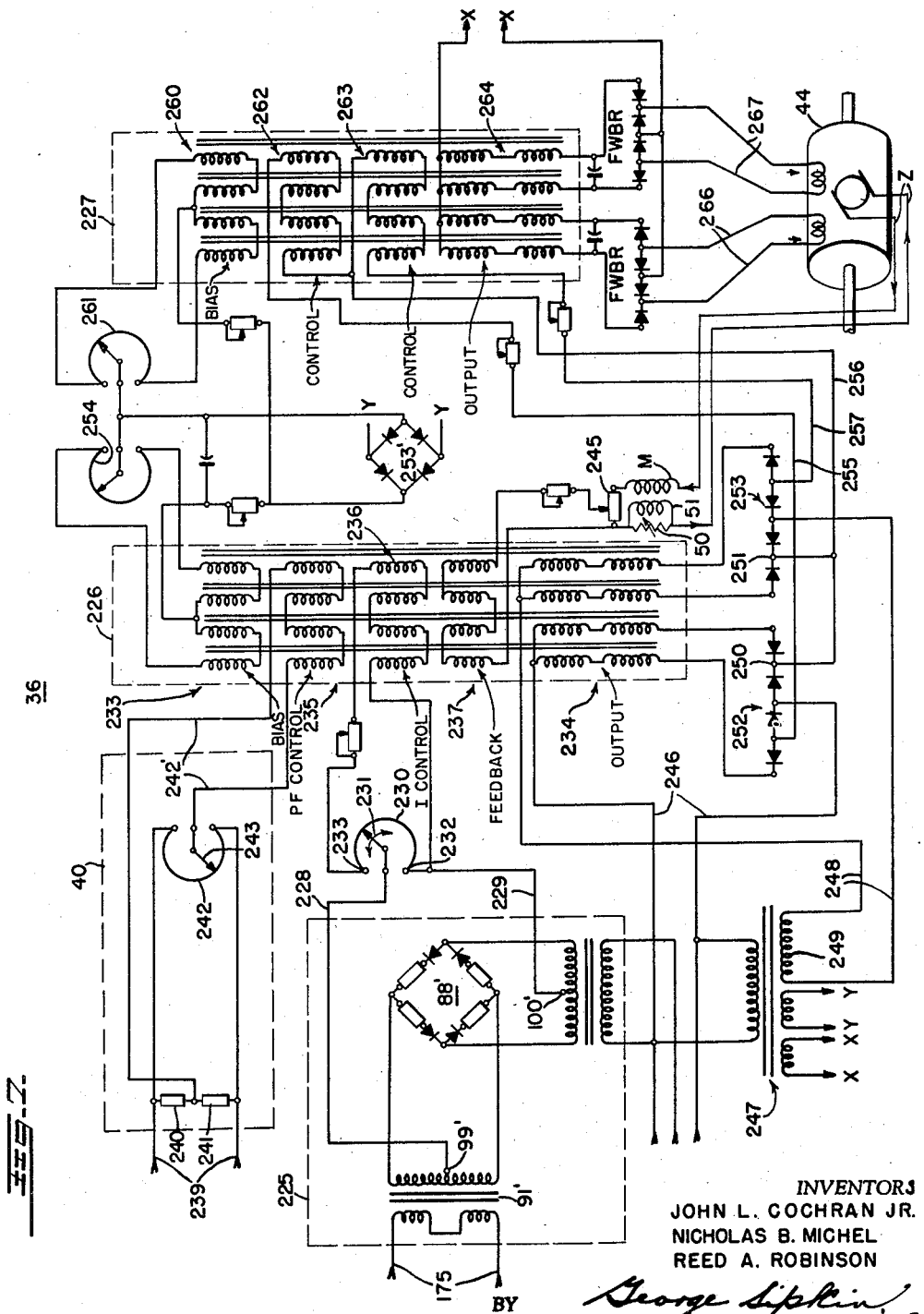

John L. Cochran, Jr., Falls Church, Va., Nicholas B. Michel, Washington, D.C., and Reed A. Robinson, Takoma Park, Md.

Application January 28, 1957, Serial No. 636,842

6 Claims. (Cl. 114—240)

(Granted under Title 35, U.S. Code (1952), sec. 266)

The invention described herein may be manufactured and used by or for the Government of the United States of America for governmental purposes without the payment of any royalties thereon or therefor.

This invention relates to degaussing systems which, as as is well known, are installed aboard ship to minimize the possibility of a ship actuating a magnetic mine or the like.

A ship containing iron distorts the magnetic lines of force of the earth's magnetic field that passes through and near the ship; and this localized distortion, or ships magnetic signature, has been utilized to set off mines. Degaussing systems, comprising degaussing coils about a ship, have been devised to minimize this danger by establishing magnetomotive forces that counterbalance or neutralize the distortion produced by the magnetic materials of the ship. These "made" magnetomotive forces are provided by passing controlled electric currents through the degaussing coils so as to set up magnetic fields which neutralize the magnetic effects of the magnetic materials of the ship. However, the motion of the ship, especially its changes in heading, rolling and pitching, make this neutralization very difficult.

The primary object of the invention is to provide an apparatus whereby the magnetic signature of a moving ship is reduced to a negligible value.

Another object of the invention is to provide a degaussing apparatus which automatically seeks to neutralize changes in a ship's magnetic field produced by the ship's roll, pitch and heading or yaw.

A further object of the invention is the provision of a method and apparatus of compensating a degaussing system for roll, pitch and heading changes.

Still another object of the invention is the provision of a degaussing system wherein the compensating current supplied to each of the longitudinal, transverse and vertical degaussing coils not only compensates for magnetic changes along the associated axis, but also compensates for magnetic changes therealong as effected by changes along the other two axes. In other words, the effects reflected along one axis by effects along the other axes are minimized.

Briefly apparatus in accordance with the invention comprises a plurality of gyro-actuated roll, pitch and heading transmitters. The outputs of the transmitters are applied to a three resolver computer via roll, pitch and heading error actuated servo systems. In the computer, mathematical functions in terms of voltage and current, as affected by all three changes, are derived. Individual induced magnetic field compensating signals from the resolver are then combined in signal amplifiers with signals derived from the permanent ship's magnetic field, so as to compensate for the permanent magnetization of the ship. The combined signals control current generators that supply the currents to the orthogonally placed degaussing coils.

Other objects and many of the attendant advantages of this invention will be readily appreciated as the same becomes better understood by reference to the following details and descriptions when considered in connection with the accompanying drawings in which like reference numerals designate like parts throughout the figures thereof, and wherein:

Fig. 1 is a diagram illustrating the earth's flux lines, and has superimposed thereon a vector diagram representative of the earth's magnetic field;

Fig. 2 is a block diagram of an automatic degaussing control system in accordance with the invention;

Fig. 3 is a schematic diagram of the disposition of degaussing coils about a ship;

Fig. 4 is a block diagram of the roll and pitch servo systems of Fig. 2;

Fig. 5 is a block diagram of the azimuth servo system of Fig. 2 but including a schematic diagram of the servo amplifier employed;

Fig. 6 is a schematic diagram of the three resolver computer of Fig. 2; and

Fig. 7 is a schematic diagram of one of the signal amplifiers of Fig. 2.

Before considering the effects of the earth's magnetic field and the magnetic field of the ship, both induced and permanent, on one another, some observations on the nature of each will be stated.

The earth's magnetic flux lines are outward and vertical at the south magnetic pole, are horizontal midway between the poles, are inward and vertical at the north magnetic pole, are outward and slanting at various angles in southern latitudes, and are inward and slanting at various angles in northern latitudes. The last is represented in Fig. 1. Considering a point on the surface of the earth at some intermediate northern latitude, as depicted in Fig. 1, the field lines 10 of the earth's field at the point may be represented by a vector E directed toward the earth at an angle $\alpha$ therewith. This field is of uniform strength as indicated by the uniformly spaced lines 10. The vector E may be broken down into two vectorial components, a horizontal vector (H) and a vertical vector (Z), each having a definite direction with respect to the surface 12 of the earth. The two vectors H and Z will have magnitudes that are dependent on the angle that the earth's field makes with the earth's surface; i.e. $H=E \cos \alpha$ and $Z=E \sin \alpha$. The magnitudes of the H and Z components are known for different geographical positions and are obtainable from charts. The Z component is upward in southern latitudes and downward in northern latitudes, while the H component is always in a direction from the magnetic south pole to the magnetic north pole. Further the value of the Z component increases and the H component decreases with an increase in magnetic latitude.

The magnetic field about a ferrous ship is complex; and the ship's field may be considered to be made up of vector components representative of a horizontal induced field, vertical induced field, a horizontal permanent field and a vertical permanent field. The ship's induced fields are the result of its being present in the earth's magnetic field; and the ship's permanent fields are due to its having become magnetized at some previous time as a result of mechanical working or magnetic agitation of its materials while in the earth's field such as occurs, for example, during building of the ship. The permanent magnetization depends upon field conditions and heading of the ship at that previous time and is therefore independent of later existing or immediate field conditions about a ship. The magnetic fields of a ship may be substantially neutralized by degaussing coils when wound on a ship at proper locations and properly energized. In effect, the undistorted earth's field conditions at a spot beneath the ship will be restored to a status that is the same as existed at the spot before the ship arrived there.

Fig. 3 shows three orthogonally disposed degaussing coils about a ship 15 assumed to be in the northern hemisphere. A vertical coil L has a horizontal axis, and when electrically energized will produce a horizontal magnetic field (L field) along the fore and aft or roll axis 16 of the ship. Another vertical coil A at right angles to coil L also has a horizontal axis and when electrically energized will produce a horizontal magnetic field (A field) along the pitch axis 17 which is perpendicular to the fore and aft axis 16 of the ship. A horizontal main coil M perpendicular to the L and A coils produces a vertical magnetic field (M field) along the heading or azimuth axis 18 which is perpendicular to the fore and aft axis of the ship. The coil L, the coil A and the coil M may be termed the "Z" plane coil, the "Y" plane coil and "X" plane coil, respectively. Additional degaussing coils P and Q (Fig. 2) are also provided to compensate for the permanent magnetism of all or particular portions of the ship, as is understood in the art. The currents for the latter two coils are normally of constant but adjustable value and are supplied from the ship's D.C. power system.

The overall system for controlling the energization of the several degaussing coils is shown in Fig. 2.

The control system comprises a suitable compass or azimuth gyro 20 with an associated heading synchro transmitter 21, and a suitable stabilizer gyro 22 with associated roll and pitch synchro transmitters 23 and 24. The azimuth gyro 20 drives the synchro transmitter 21 in such a way that the signal output from the stators of the transmitter is proportional to the heading angle of the ship with respect to true north. The stabilizer gyro 22 drives the synchro transmitters 23 and 24 in such a way that their signal outputs are proportional to twice the roll and pitch angles for a reason subsequently explained. Both the gyros 20 and 22 and the rotor windings 25 of the synchro transmitters 21, 23 and 24 are energized from A.C. reference supply 26 hereinafter referred to as the reference voltage supply. It will be understood however, that one gyro may serve all three synchro transmitters. Gyros and associated synchro transmitters for ship control are well known to the art, and those shown operate in such a manner that when the ship deviates from a true north heading, or moves about its longitudinal or transverse axis, they produce electrical signals representative of the roll, pitch and heading angles. The roll and pitch signals are fed respectively to a roll servo system 28 and a pitch servo system 29. The heading signal prior to being fed to the heading servo system 31 is delivered to a magnetic variation synchro transmitter 32 wherein heading signals with respect to true north are converted to heading signals with respect to magnetic north.

A computer 34, shown in more detail in Fig. 6, is provided in which the various magnetic components, i.e., the electric quantities representative of them, are combined for comparison with quantities representative of the known earth's magnetic field as obtained from navigation charts for the area in which the ship is operating. To this end, the mechanical rotary outputs of servo systems 28, 29 and 31 are applied to the computer 34 and provide factors therein proportional, respectively, to the angle of roll about axis 16 with respect to the horizontal, to the angle of pitch about axis 17 with respect to the horizontal, and to the angle of heading with respect to magnetic north.

So that it may function as intended, the computer 34 is also supplied with signals corresponding to the magnitude of the horizontal (H) and vertical (Z) components of the earth's magnetic field. These signals are obtained from H setting and Z setting magnitude controls 35 and 36, respectively. The magnitudes of the signals are obtained from navigation charts for the area in which the ship is operating.

The computer 34 then has signals fed thereto representative of the roll, pitch and heading angles, and signals representative of the earth's field components which modify or compensate the angles accordingly. The computer provides the compensated signals or functions to L, A and M signal amplifiers 38, 37 and 33 respectively. Also supplied to these amplifiers are three preset signal currents proportional to the ship's permanent field components along the three axes. The last signals are rectified in full wave rectifier 39 supplied with power from source 26 and are added to the amplifiers, with the proper polarity, through control circuits 40, 41 and 42. These D.C. currents are for the purpose of cancelling the ship's permanent magnetic field components from the function signals from computer 34.

The outputs of the signal amplifiers 33, 37 and 38 are fed through a switching terminal 43 to suitable current generators 44, 45 and 46 connected to degaussing coils M, A and L, respectively. The amplifier outputs control the degaussing currents in their respective degaussing coils in accordance with changes from the ship's desired position. The P and Q coils are fed from the ship's D.C. power supply 47 over conductors 48.

Should trouble occur in the automatic circuits, the switching terminal 43 is adapted to disconnect the signal amplifiers and connect the D.C. source 47 over leads 49 to the current generators whereby, through suitable potentiometers in supply 47 and polarity switches in terminal 43, the degaussing currents may be manually controlled.

Provided in series with the degaussing coils are variable resistors 50; and connected across each resistor is a compass compensating coil 51 adapted to be disposed about the ship's magnetic compass for neutralizing the effect on the compass of the compensating fields set up by the degaussing coils thereon.

The roll servo system 28 is identical to the pitch servo system 29 and its component parts are depicted in Fig. 4. As described hereinbefore, the transmitter 23 feeds signals to the roll servo system 28, more specifically, a control transformer or receiver 60 of the roll servo system. The receiver 60 comprises stator windings 61 and a rotor winding 62 for a rotor 62'. As is understood in the art, the transmitter signals that are applied to the stator windings 61 cause the rotor 62' to turn through an angle twice that of the roll angle. The rotor is coupled via shaft 63 to an indicator 64 and a gear train 65 having output shaft 66. The gear train has a reducing ratio of 1 to 2 so that the displacement of the roll resolver 34' in computer 34, as caused solely by shaft 66 is half that of the control transformer rotor 62'.

The transmitter 23 and receiver 60 comprise a self-synchronizing system. In the system, when the rotor 62' of the control transformer 60 is at the same angle as the angle transmitted to the stators 61 by the transmitter 23, no voltage is induced in its winding 62 and there is no turning torque. However, if the rotor angle differs from that transmitted, a voltage will be induced in the rotor winding proportional to the sine of the difference angle. This difference angle signal is delivered to a servo amplifier 67, the output of which is fed via leads 68 to drive the variable phase of a two-phase servo motor 69. The servo motor 69 provides an amplified torque through a second gear train 71, coupled to shaft 66, that is powerful enough to rotate the roll resolver 34', indicating dial 64, and the control transformer rotor 62'. The rotation is in a direction to decrease the difference between the angle of rotor 62 and that of the transmitter. Since the roll angle is transmitted at double speed by rotor winding 62, the resolver is geared down proportionally. Thus, any deviation of the resolver angle from the actual angle of roll of the ship results in rotation of gear train 71 which reduces the deviation until the resolver angle is equal to the roll angle. This arrangement provides a continuous and very rapid process that enables the gear trains to keep up with the roll movements of the ship. It may be seen therefore that the servo system is an error actuated servo mechanism. The pitch servo system 29 is like that of the roll servo system 28.

The azimuth servo system 31 is shown in Fig. 5 in which the same reference numerals are used for parts that correspond to like referenced parts of the roll servo system 28. The system 31 differs from the roll and pitch servo systems in that the signals from the heading gyro 20 are not applied directly to a control transformer such as 60 but are applied first to a magnetic variation synchro or differential generator 80 to convert true heading to magnetic heading. The rotor 81 of the generator 80 is rotated or adjusted manually to the angle of magnetic variation for the ship's geographic position. The signal from the winding 81' of the adjusted rotor 81 of the differential generator will correspond to the ship's magnetic heading when the true heading angle signal from gyro 20 is applied to the stators 82 thereof. The true magnetic heading is applied to the control transformer 60 and the azimuth gear train 65' that drives azimuth resolver 34' in computer 34. In the azimuth servo system, however, the gear train 65' is not a reducing gear but has a ratio of 1:1; otherwise the operation of the azimuth servo is the same as the operation of roll and pitch servo systems.

Fig. 5 further shows a schematic diagram of the servo amplifier 67 employed in each of the three servo systems. The servo amplifier comprises a demodulator circuit 85, a first stage magnetic amplifier 86, and an output or second stage magnetic amplifier 87.

The demodulator, well known to the art, comprises a bridge circuit 88, each leg containing rectifiers 89 and associated balancing resistors 90. An input transformer 91 having a primary winding 92 and a center tapped secondary 93 is provided for applying the control transformer output signal across one set of opposite terminals 94 of the bridge rectifier; and a reference transformer 95 having a primary 96 and a center tapped secondary 97 is provided to couple the reference A.C. power from supply 26 (Fig. 2) to the other set of opposite terminals 98. The D.C. output of the demodulator 85 is taken from the center taps 99 and 100 of the secondaries of the signal and reference transformers respectively. It is the function of the demodulator to convert the control transformer signal, whose magnitude and A.C. phase polarity are proportional to the sine of the error angle, to a D.C. voltage proportional in magnitude and polarity to the sine of the error angle. When no signal is applied to input transformer 91 or to reference transformer 95 the output current of the demodulator is zero. With signals impressed on the input transformer 91 and with a reference voltage on transformer 95, the output current will be a function of the magnitude of the signal voltage, and since the signal voltage and reference voltage will be either in phase or 180° out of phase, the output signal will be either positive or negative with a magnitude depending on the magnitude of the input signal. A resistor and capacitor combination are also provided in the demodulator output to keep the system from oscillating.

The first stage amplifier 86 comprises two single phase "single ended" full wave bridge magnetic amplifier sections 101 and 102, each having control 103 winding, a bias winding 104 in two bias-sections and output winding 105. Each amplifier section is connected in push pull through rectifiers 106 whereby a D.C. output is obtained over each pair of the pairs of conductors 107 and 108. Resistors 109 are inserted in the output circuit of the first amplifier to swamp out the inductive effect of the second stage control windings.

The bias windings 104 and supplied from the ship's D.C. supply through a potentiometer-resistor 110 which provides a bias adjustment for the amplifier by increasing the current through one bias-section and of bias winding 104 while decreasing the current through the other bias-section of bias winding 104. This type of bias is provided to compensate for small inequalities in the circuit components so that the amplifier may be balanced to zero net output.

The output windings 105 are supplied with A.C. power from supply 26. The control windings 103 are wound so that if the control signal opposes the bias current in one amplifier section it aids the bias current in the other amplifier section. This relationship is indicated by arrows in Fig. 5. Hence the relationship is such that when one section 101 is being driven toward saturation the other 102 is driven away from saturation. Therefore, as the output of one amplifier section increases, the output of the other decreases depending on the polarity of the demodulator output.

The output of the demodulator 85 supplies the control winding 103 of the first amplifier 86 with a D.C. signal proportional to the sine of the error angle between the control transformer rotor 62' and the signal transmitted thereto. With no current flowing in the control windings 103, both amplifier sections 101 and 102 have equal output currents. However when a control signal is applied, the output of one section will increase and the output of the other decrease depending on the polarity of the control signal. The two outputs from the first stage amplifier are bucked against each other in the control windings of the second stage amplifier, hence it is the difference in the outputs of the section of the first stage amplifier 85 which drives the second stage amplifier 87.

The second stage magnetic amplifier also comprises two sections 111 and 112, each having bias, control and output windings 113, 114 and 115, respectively. The control windings 114 in each section are opposing, and the net control signals oppose the bias windings 113 in one section and aid the bias windings in the other as represented by the arrows. Thus as with the first stage amplifier, when the conduction of one section increases, the conduction of the other decreases.

The bias windings 113 are supplied from the D.C. power supply through a potentiometer 116 as in amplifier stage 86.

The output windings 115 however, derive their A.C. power from opposite ends of a center tapped secondary winding 117 of a transformer 118, so that with relation to each other the output currents of each section 111 and 112 will be 180° out of phase. The primary 119 of transformer 118 is connected to the ship's reference voltage source 26. Rectifiers 120 are connected to the output windings 115 of the second stage amplifier 87 to convert the output to a D.C. signal output. The signal output will have a polarity depending on which section 111 or 112, has the greatest output. If the output of each section is equal, the net output will be zero. The output of the second stage amplifier 87 over conductors 121 and 68 drives the variable phase of the servo motor 69. The fixed phase is obtained from a secondary 122 of the same transformer 118 that supplies the split phase to the output windings of the second stage amplifier 87. Capacitor 123 introduces the necessary phase shift to enable the servo motor to operate.

Before a description of the computer is undertaken, the following discussion of the mathematical functions involved is made in connection with the required induced components of degaussing coil current functions, which vary with roll, pitch, and heading, as referenced to the earth's field vectors.

L coil function

If it is assumed that the ship in Fig. 3 is running on an even keel at a north magnetic heading, the L field developed by the L coil will be directly opposing the H vector. As the ship changes heading, this L field must be made to fall off as the cosine of the heading angle until, at a 90° heading, the ship is running perpendicular to the H vector with the result that no L induced field is needed. At angles greater than 90°, the L field must build up in a reverse direction until another maximum, of opposite polarity, is reached at 180°. Thus, assuming that the ship is operating on an even keel, the L coil degaussing function is $H \cos U$, where H is the magnitude of the horizontal component of the earth's magnetic field for the area in which the ship is operating, and U is the angle of ship's heading from magnetic north.

Suppose now that the ship is heading at some angle U from magnetic north, with an L field proportional to $H \cos U$, and a pitch angle V is introduced by raising the bow of the ship. As the bow of the ship is raised, the L field forms a vertical angle V with the H vector in addition to the horizontal angle U. Thus, the $H \cos U$ function will fall off as the cosine of the pitch angle V, making the signal a function of $H \cos U \cos V$.

Now that a pitch angle has been introduced, the Z vector of the earth's magnetic field is no longer perpendicular to the L field so that as the bow is raised, the Z vector begins to contribute a component to the L field in a direction which aids the L field, making it greater than desired. This component $Z \sin V$ must therefore be subtracted from the L field of the L coil.

Since the ship rolls about the L field axis, the L field will not be affected by the roll of the ship. The total L coil degaussing function is then $H \cos U \cos V - Z \sin V$.

*A coil function*

With the ship as indicated in Fig. 3, the A field is perpendicular to both the H and Z vectors so that under this condition, the A coil current should be zero.

As the ship changes heading the A field should increase as the sine of the angle of magnetic heading until at 90°, when the sine is equal to 1.0 and the A field is parallel to the H vector, the A field is at a maximum. This term of the A function will not be affected by the pitch angle V since the ship pitches about the A field axis which is perpendicular to the H vector. The A coil function will, however, fall off as the cosine of the roll angle W. Consequently the first term of the A coil function is $$H \sin U \cos W$$

When the ship pitches, the $H \cos A$ component, along the L field axis, presents a vertical component $$H \cos A \sin P$$

to the M field axis. If the ship begins to roll when in this condition, the $H \cos A \sin P$ component along the M field axis will present an athwartship component $H \cos U \sin V \sin W$ along the A field axis giving the second term of the A coil function. Notice that since this term involves both factors sin V and sin W, it will be zero if either the pitch angle V or the roll angle W is zero.

With respect to rolling, as long as the roll angle W, is zero, the A field axis is perpendicular to the Z vector. As might be expected then, the Z term in the A coil function will involve the sine of the roll angle. This term $Z \sin W$, when present, will fall off as the cosine of the pitch angle V making the term $Z \sin W \cos V$.

Addition of the three A coil terms gives the resultant A coil function $H \sin U \cos W + H \cos U \sin V \sin W + Z \sin W \cos V$.

*M coil function*

With the ship as indicated in Fig. 3, the M field axis is perpendicular to the H vector so that the H terms in the M coil function are zero and will remain zero with changes in heading, since the ship changes heading about the M field axis. If the ship rolls, however, the $H \sin U$ component present on the A axis presents a component $H \sin U \sin W$ to the M axis of a polarity that must be subtracted from the M field.

When the ship pitches, the $H \cos U$ component along the L axis presents a term to the M axis which will increase as the sine of the pitch angle and fall off as the cosine of the roll angle. The second term of the M coil function is $H \cos U \sin V \cos W$.

The Z vector normally has the greatest influence on the M field since this vector is parallel to the M field axis when the roll and pitch angles are zero. The M field must be made to fall off as the roll angle W and the pitch angle V increase. Therefore, the M field is a function of the cosines of the roll and the pitch angles. The heading angle will not affect this term since the ship rotates about the M axis when changing heading. Thus, the third term in the M coil function is $Z \cos W \cos V$ giving a total function of $-H \sin U \sin W + H \cos U \sin V \sin W + Z \cos V \cos W$.

The following are the formulae, as developed in the preceding paragraphs, describing the required induced components of degaussing coil currents which vary with roll, pitch, and heading.

M coil current = $K_m(-H \sin U \sin W + H \cos U \sin V \cos W + Z \cos V \cos W)$ A coil current = $K_a(H \sin U \cos W + H \cos U \sin V \sin W + Z \cos V \sin W)$ L coil current = $K_l(H \cos U \cos V - Z \sin V)$ Where $K_m$, $K_a$ and $K_l$ are proportionality constants for each of the coils that depend on physical parameters.

Referring now to Fig. 6, there is shown the computer which derives the above discussed functions. The computer comprises three resolvers 155, 156 and 157 connected respectively to the azimuth, roll, and pitch servo systems. The azimuth resolver 155 comprises a rotor winding 158, mechanically linked to the A servo 31 and two stator windings 159 and 160. Rotor winding 158 is parallel to stator 159 and shown in a zero angle position with respect thereto and perpendicular to stator winding 160. As is understood, when the rotor 158, in a zero angle position, is parallel to a stator 159, the output from that stator is a maximum, and as the rotor is turned, the output from that stator falls off in proportion to the cosine of the rotor angle until at 90° the voltage induced in the stator is zero. Hence with an input voltage H applied to rotor 158 the output of stator winding 159 will vary as $H \cos U$. Similarly, the output of stator winding 160 will vary as $H \sin U$.

The pitch resolver 157 comprises two perpendicularly disposed rotor windings 162 and 163. Rotor winding 162 is the zero angle horizontal rotor, and rotor winding 163 the zero angle vertical rotor. The rotor windings are mechanically linked together and to the pitch servo 29. Two perpendicular windings 164 and 165 are also provided. Stator winding 164 is normally parallel with rotor winding 162 and stator winding 165 is parallel with rotor winding 163. As is understood, with signals of predetermined polarities fed to both rotor windings, the output of the resolver from one stator winding is the sum of the sine and cosine function of the signals fed thereto and from the other stator the difference between the sine and cosine functions of the signals fed to the rotors. Hence with the signal $H \cos U$ from stator 159 of resolver 155 applied to rotor winding 162 via an impedance matching transformer 166 and the Z signal fed to the zero angle horizontal rotor winding 163, the output from stators 164 and 165, respectively, will be $H \cos U \cos V - Z \sin V$, and $H \cos U \sin V + Z \cos V$. The former represents the L coil function and is fed to the L signal amplifier 38.

The roll resolver 156 is identical with the P resolver and comprises two perpendicularly disposed rotor windings 167 and 168 and stator windings 170 and 171 parallel thereto, respectively. The rotor winding 167 is the zero angle horizontal rotor winding. The stator output $H \sin U$ of azimuth resolver 155 is fed to rotor winding 168 of roll resolver 156 via impedance matching transformer 172 (the crossed over leads 173 providing the proper phase); and the output $H \cos U \sin V + Z \cos V$ from stator 165 of pitch resolver 157 is fed to zero angle horizontal rotor winding 167 of roll resolver 156. The output from stator windings 170 and 171 of resolver 156 will then be $-H \sin U \sin W + H \cos U \sin V \cos W + Z \cos V \cos W$, and $H \sin U \cos W + H \cos U \sin V \sin W + Z \cos V \sin W$ respectively. The former is fed via conductors 175 to the M or heading signal amplifier 33; and the latter is fed to the A or pitch signal amplifier 37, respectively. It will be noted that these are the required functions discussed above for the induced magnetic components.

Referring now to Fig. 7, a signal amplifier for amplifying and combining the permanent magnetic components and the induced magnetic components is schematically shown. The signal amplifier 33 of Fig. 2, for example, comprises a demodulator 225, a first stage of magnetic amplification 226, and an output stage of magnetic amplification 227. The demodulator 225 is similar in operation to that in the servo system amplifier 67 and has similar reference numerals.

The demodulator 225 develops a D.C. output signal across its output conductors 228 and 229 that depends in magnitude and polarity on the signal fed via conductors 175 to the transformer 91' of the demodulator from the stator 170 of the roll resolver 156 in computer 34. The output of the demodulator 225 is connected to a manually-adjustable induced magnetic control rheostat 230 by the conductor 228 connected from center tap 99' to a movable arm 231 of the rheostat and by the conductor 229 connected from a center tap 100' to one end 232 of the rheostat. It will be seen that such a connection in effect shorts out the demodulator when the rheostat arm 231 is in a minimum position directly connected to end terminal 232. However, the demodulator 225 is designed not to draw excessive current when its output terminals are shorted. The end terminal 232 and the other end terminal 233 of the rheostat are connected across the induced (I) component control windings 236 in the first stage magnetic amplifier 226. The connection of the demodulator 225 to the rheostat 228 as described above prevents the $L/R$ time constant of the control windings 236 from changing radically when the rheostat 228 is turned to a low value, which would otherwise occur if the output were taken directly from the movable arm 231 of the rheostat.

The first stage amplifier 226, which is of the same type as that of the first stage amplifier in the servo systems, comprises bias windings 233, output windings 234, and control windings including permanent magnetic field PF signal control windings 235, induced magnetic field signal I control winding 236, and feedback signal control windings 237. The net driving signal for this amplifier then, is the difference between a feedback signal proportional to the degaussing coil current, and the sum of the induced magnetic signal and the permanent magnetic signal.

The permanent magnetic field signal is derived from the control circuit 40 connected to the reference voltage supply 26 through the full wave rectifier 39, via conductors 239. The magnitude of the permanent magnetic field signal is controlled through a resistance network of fixed resistors 240 and 241 in parallel with an adjustable rheostat 242. As seen in Figure 7, the control windings 235 are connected via conductors 242' to the junction of fixed resistors 240 and 241 and to the movable arm 243 of the rheostat 242, so as to allow both positive and negative values to be applied to the permanent field control winding 235.

As hereinbefore noted, the induced magnetic field signal from the demodulator 225 is fed to the induced magnetic field control winding 236.

The feedback signal is obtained from a low resistance 245 in series with the degaussing coil M being controlled by the degaussing current generator 44.

The feedback signal is fed to its control winding 237 in opposition to the reference A.C. signal supplied to the output windings 234. The output windings in both sections are powered respectively over conductors 246, connected to the primary of an isolation transformer 247, and conductors 248 connected to the secondary 249 of transformer 247. This power connection is necessary because the positive terminals 250 and 251 of rectifiers 252 and 253 are connected, and the output windings 235 must therefore draw their power from isolated supplies in order to prevent a short circuit through the rectifiers.

The bias windings 233 are similarly supplied, as noted in Fig. 7, from a full wave rectifier 253' connected across secondary terminals yy of transformer 247 through a potentiometer 254. The first stage amplifier whose D.C. output is derived from the full wave bridge rectifiers 252 and 253 over conductors 255 and common conductor 256 is designed to produce a maximum output several times greater than that necessary to drive the second stage amplifier 227 to saturation in order to improve the response time of the amplifier.

The second stage amplifier 227 is a push pull amplifier that operates in the same manner as the first stage amplifier 226 and comprises bias windings 260 supplied from the D.C. supply under control of potentiometer 261, opposing control windings 262 and 263, and output windings 264 powered from the secondary 249 of isolation transformer 247 through connections X—X.

The two D.C. output signals supplied over conductors 255, 256, and 257 from the first stage amplifier 226 are fed to the opposing control windings 262 and 263 and it is the difference between the two applied D.C. signals which drives the second stage amplifier 227. This difference signal produces in the second stage signal amplifier two D.C. currents which are supplied to two opposing field windings in the degaussing current generator over conductors 266 and 267. When both of these output currents are equal, which occurs when the outputs of the first stage are equal, the opposing generator fields cancel and the degaussing current supplied to coil M will be zero. Departure from equality in the outputs produces a positive or negative degaussing current depending on which of the two opposing generator fields receives the greater excitation.

It may now be seen that applicants have provided a system which reduces a ship's magnetic signature to a negligible value by taking into consideration movements of a ship about its longitudinal, transverse and vertical axes, and the earth's magnetic field.

Obviously many modifications and variations of the present invention are possible in the light of the above teachings. It is therefore to be understood that within the scope of the appended claims, the invention may be practiced otherwise than as specifically described.

What is claimed is:

1. Degaussing equipment for a ship having degaussing coils in each or three different planes, comprising means for supplying each coil with current, said means also including variable control means for each coil for controlling the current in the associated coil, and means connected to each control means for varying the current thereof in accordance with a mathematical function of the angles of roll, pitch and heading of said ship from a predetermined heading and position.

2. Automatic equipment for adjusting degaussing currents in a plurality of degaussing coils in the longitudinal, transverse, and vertical directions of a ship, comprising a first means responsive to roll, pitch and heading deviations of a ship from a predetermined sailing position at a point on the surface of the earth, second means for feeding current to said coils, and control means connected to said second means and under control of said first means for controlling the current in each of said coils, said control means including a variable control responsive to the combined effect along the associated axis of the said deviations along said axes.

3. Equipment as defined in claim 2 but further characterized by a control circuit in said control means for biasing said control means in accordance with the permanent magnetic field of said ship.

4. Equipment as defined in claim 2 but further characterized by means connected to said control means for superimposing on said control means a control responsive to components of the earth's magnetic field at the said position.

5. Equipment as defined in claim 4 but further characterized by a control in said control means for biasing said control means in accordance with the permanent magnetic field of said ship.

6. Degaussing equipment for a ship comprising a plurality of degaussing coils, a coil being provided for establishing a magnetic field about the ship in each of its longitudinal, transverse and vertical axes, means providing an output dependent upon heading angular deviation $U$, the pitch angular deviation $V$, and the roll angular deviation $W$ of the ship from a predetermined sailing position at a point on the surface of the earth at which the earth's magnetic field has horizontal and vertical magnetic field components of intensity $H$ and $Z$, respectively, power means to supply current to said coils, and connection means between said power means and said coils, said connection means including control means operated by said output means for controlling the currents in the several degaussing coils such that the current in each coil associated with said longitudinal, transverse, and vertical axis respectively is proportional to:

(1) $H \cos U \cos V - Z \sin V$,
(2) $H \sin U \cos W + H \cos U \sin V \sin W + Z \cos V \sin W$, and
(3) $-H \sin U \sin W + H \cos U \sin V \cos W + Z \cos V \cos W$.

References Cited in the file of this patent

UNITED STATES PATENTS

| | | |
|---|---|---|
| 2,421,583 | Stuart | June 3, 1947 |
| 2,730,063 | Gebs | Jan. 10, 1956 |